United States Patent [19]

Tubbs

[11] Patent Number: 5,813,030
[45] Date of Patent: Sep. 22, 1998

[54] CACHE MEMORY SYSTEM WITH SIMULTANEOUS ACCESS OF CACHE AND MAIN MEMORIES

[75] Inventor: Michael Eugene Tubbs, Montgomery, Tex.

[73] Assignee: Compaq Computer Corp., Houston, Tex.

[21] Appl. No.: 850,370

[22] Filed: May 2, 1997

Related U.S. Application Data

[63] Continuation of Ser. No. 445,903, May 22, 1995, abandoned, which is a continuation of Ser. No. 815,705, Dec. 31, 1991, abandoned.

[51] Int. Cl.⁶ .................................................. G06F 12/00
[52] U.S. Cl. .................................... 711/118; 711/144
[58] Field of Search .................................. 711/128, 133, 711/135, 144, 129, 143, 118

[56] References Cited

U.S. PATENT DOCUMENTS

| | | | |
|---|---|---|---|
| 3,848,234 | 11/1974 | MacDonald | 395/425 |
| 3,896,419 | 7/1975 | Lange et al. | 711/129 |
| 4,439,829 | 3/1984 | Tsiang | 395/425 |
| 4,504,902 | 3/1985 | Gallaher et al. | 395/462 |
| 4,567,578 | 1/1986 | Cohen et al. | 395/425 |
| 4,586,133 | 4/1986 | Steckler | 395/325 |
| 4,819,154 | 4/1989 | Stiffler et al. | 364/200 |
| 4,847,758 | 7/1989 | Olson et al. | 395/460 |
| 4,858,111 | 8/1989 | Steps | 711/143 |
| 4,933,835 | 6/1990 | Sachs et al. | 395/425 |
| 5,047,920 | 9/1991 | Funabashi | 395/444 |
| 5,097,409 | 3/1992 | Schwartz et al. | 395/425 |
| 5,155,833 | 10/1992 | Cullison et al. | 395/425 |
| 5,179,680 | 1/1993 | Colwell et al. | 395/425 |
| 5,210,845 | 5/1993 | Crawford et al. | 395/455 |
| 5,247,648 | 9/1993 | Watkins et al. | 395/425 |
| 5,249,282 | 9/1993 | Segers | 395/425 |
| 5,265,232 | 11/1993 | Gannon et al. | 395/425 |
| 5,285,323 | 2/1994 | Hetherington et al. | 395/425 |
| 5,333,296 | 7/1994 | Bouchard et al. | 395/444 |
| 5,355,467 | 10/1994 | MacWilliams et al. | 395/473 |
| 5,404,489 | 4/1995 | Woods et al. | 395/473 |
| 5,530,833 | 6/1996 | Iyengar et al. | 395/455 |

FOREIGN PATENT DOCUMENTS 0166341  1/1986  European Pat. Off. .

OTHER PUBLICATIONS

Technical Paper entitled "Processor Performance Enhancement Using a Memory CacheScheme", IBM Technical Disclosure Bulletin, vol. 32, No. 6A, Nov. 1989, pp. 373–379.
Technical Paper entitled "Processor Performance Enhancement Using a Memory CacheScheme", IBM Technical Disclosure Bulletin, vol. 32, No. 6A, Nov. 1989, pp. 373–379.
Chapter entitled "Cache Memory Design", Cypress Semiconductor, pp. 11–31.

Primary Examiner—David L. Robertson
Attorney, Agent, or Firm—Vinson & Elkins L.L.P.

[57] ABSTRACT

A processing system includes a cache memory system which receives an address and a memory request from a processor. Simultaneously, information is accessed responsive to the address from a main memory and from a cache memory. During access of the information from the main memory and cache memory, it is determined whether the desired information is stored in the cache memory. If so, the information is output from the cache memory; if not, the information is output from the main memory.

16 Claims, 3 Drawing Sheets

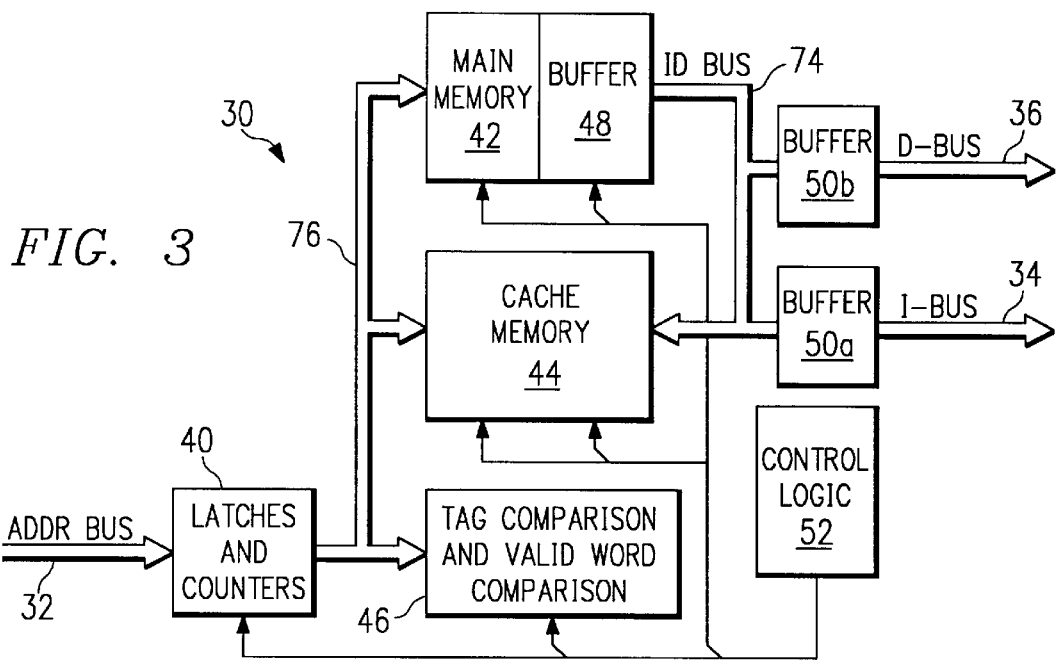

CACHE MEMORY SYSTEM WITH SIMULTANEOUS ACCESS OF CACHE AND MAIN MEMORIES

RELATED APPLICATIONS

This application is a continuation of application Ser. No. 08/445,903, filed May 22, 1995, now abandoned, which was a continuation of application Ser. No. 07/815,705, filed Dec. 31, 1991, now abandoned.

TECHNICAL FIELD OF THE INVENTION

This invention relates in general to electronic circuits, and more particularly to a cache memory method and circuit for use in a processing system.

BACKGROUND OF THE INVENTION

Cache memory systems are used to decrease the access time between a processor and a large main memory. A cache memory system provides increased speed by storing a portion of the main memory's data in a high-speed memory. Cache memories are effective because, in many applications, the processor repeatedly accesses the same memory locations. For example, during execution of an application, a number of instructions may be repeatedly executed. By storing the instructions in a high-speed cache memory, the instructions will be available to the processor more rapidly. If the requested data is not in the cache, the data may be retrieved from the main memory.

The association between the information stored in the main memory and the information stored in the cache is specified by means of a mapping function. In a direct-mapping architecture, each location in the main memory maps to a unique location in the cache. Since the main memory is much larger than the cache memory, each location in the cache maps to a number of locations in the main memory. The advantage of a direct-mapped cache is the simplicity of implementation.

In a set-associative cache, information from a main memory location may potentially reside at any one of n locations in the cache memory where n is the number of sets (i.e., in a 4-way set associative cache, information may reside in one of four distinct locations). The set-associative mapping architecture groups blocks of the cache memory into sets and maps a block of main memory to reside in a block of one of the sets. The set-associative mapping technique provides more flexibility, albeit in a more complex implementation.

In any cache system, a trade-off exists between the speed of the cache memory and its costs and/or complexity. Naturally, it is always desirable to increase the speed of a cache without affecting its cost or complexity.

Therefore, a need has arisen for a cache memory system which provides increased speed without a substantial increase in cost or complexity.

SUMMARY OF THE INVENTION

The present invention provides a method and apparatus for accessing information using a cache memory which significantly increases its efficiency.

In the present invention, an address is received indicating the desired information stored in a main memory. The main memory is accessed to retrieve the information at the received address. During the access to the main memory, information is accessed from the cache memory at a location corresponding to the received address. Also during the access of the main memory, it is determined whether the desired information is stored in the cache memory. If the desired information is stored in the cache memory, then the information is output from the cache memory as it becomes available. Otherwise, the information is output from the main memory when it becomes available.

The present invention provides a significant advantage over the prior art by simultaneously accessing the main memory and cache memory while determining whether the desired information is stored in the cache memory. If the desired information is not in the cache memory, then a significant portion of the access of the main memory will already be underway. In addition, since the cache memory access proceeds in parallel with the determination of whether the information is in the cache, the information is immediately available upon determination of its presence.

BRIEF DESCRIPTION OF THE DRAWINGS

For a more complete understanding of the present invention, and the advantages thereof, reference is now made to the following descriptions taken in conjunction with the accompanying drawings, in which:

FIG. 3 illustrates a block diagram of the cache memory system;

FIG. 4 illustrates a block diagram describing the relationship between the cache memory and main memory in a direct-mapping architecture;

DETAILED DESCRIPTION OF THE INVENTION

The preferred embodiment of the present invention and its advantages are best understood by referring to FIGS. 1–6 of the drawings, like numerals being used for like and corresponding parts of the various drawings.

Figure 1:
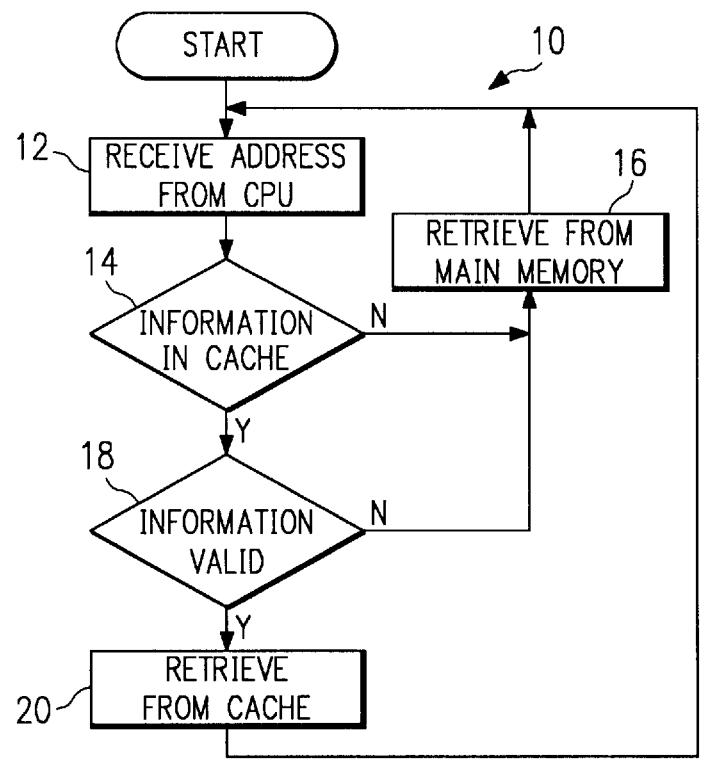
FIG. 1 illustrates a flow chart describing a prior art cache system.

FIG. 1 illustrates a flow chart 10 describing the operation of a prior art cache system. In block 12, the cache system waits until an address is received from the CPU. In decision block 14, the cache system determines whether the information corresponding to the address is within the cache memory. If not, the data is retrieved from main memory in block 16. If the information is in the cache, then it is determined in decision block 18 whether the information in the cache remains valid. If so, the information is retrieved from the cache memory and the cache system returns to the starting point to await the next address. If the information is not valid in decision block 18, the information is retrieved from main memory.

Figure 2:
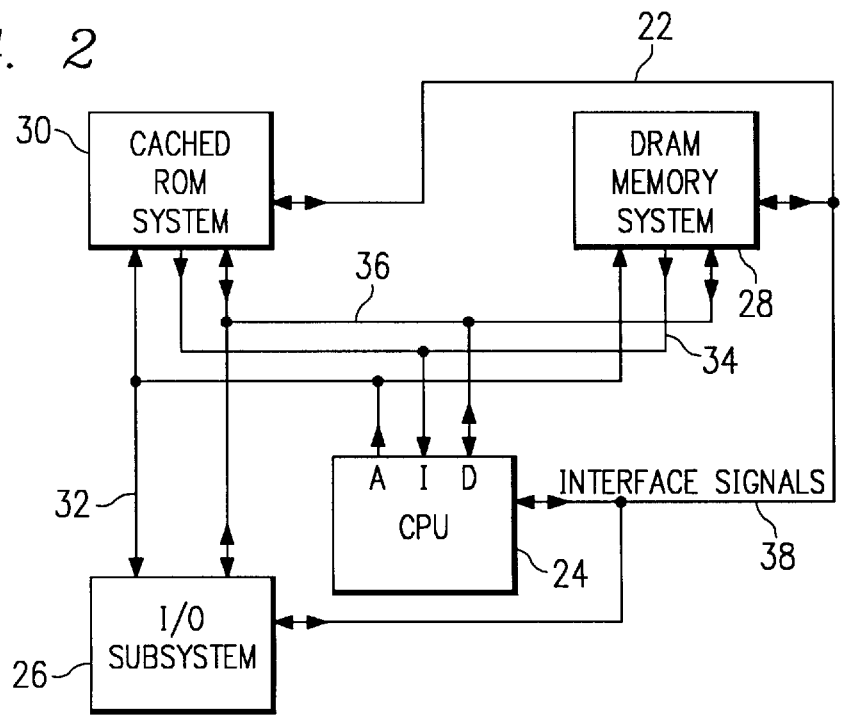
FIG. 2 illustrates a block diagram of a processing system using ache memory system of the present invention.

FIG. 2 illustrates a processing system 22 incorporating the cache memory system of the present invention. For purposes of illustration, the processing system 22 is designed around an AMD 29000 processor, available from Advanced Micro Devices of Sunnyvale, Calif., which has separate address, instruction and data buses. The particular implementation described herein is a design for controlling a printer; however, the processing system 22 could be modified for other purposes as well.

The processing system 22 comprises four major subsystems: a CPU (central processing unit) 24, a I/O (input/output) subsystem 26, a DRAM (dynamic random access memory) system 28 and a cached ROM (read only memory) system 30. Address bus 32 outputs addresses from the CPU 24 to the I/O system 26, DRAM memory system 28 and cached ROM system 30. An instruction bus 34 transfers instructions from DRAM memory system 28 and cached ROM system 30 to CPU 24. Bidirectional data bus 36 transfers data between CPU 24, I/O system 26, DRAM memory system 28 and cached ROM system 30. Interface bus 38 is coupled between the CPU 24, I/O system 26, DRAM memory system 28, and cached ROM system 30.

In operation, the cached ROM subsystem 30 stores the instructions for execution by the CPU 24, along with other information, such as fonts. The DRAM memory system 28 stores the data to be printed, along with configuration information and downloadable font information. The I/O system 26 communicates with the other components of the printer.

As illustrated herein, the cached ROM system 30 uses a ROM to store instructions for the CPU. Due to the large amount of instruction memory required (3–4 megabyte), ROM's are the best choice for nonvolatile storage. However, since fast, large ROM's are prohibitively expensive or unavailable, it is desirable to cache instructions in a high-speed memory, such as a SRAM (static random access memory), in order to provide instructions to the CPU 24 as quickly as possible.

FIG. 3 illustrates a block diagram of the cached ROM system 30. The address bus 32 is coupled to input circuitry 40 which comprises latches and counters. The input circuitry 40 is coupled to main memory 42, cache memory 44 and tag and valid word comparison circuitry 46 via latched address bus 76. Main memory 42 (the instruction ROM) is coupled to buffer 48 and cache memory 44 is coupled to ID bus 74. Control logic 52 is coupled to input circuitry 40, main memory 42, buffer 48, cache memory 44, buffers 50a and 50b, and tag and valid word comparison circuitry 46. The output of buffer 48 is coupled to ID bus 74. ID bus 74 is coupled to instruction bus 34 and data bus 36 via buffers 50a and 50b, respectively.

In the preferred embodiment, buffer 48 is a high-speed tri-state buffer having sufficient switching times to enable and disable the output of the main memory 42 to the instruction bus such that the instruction bus may switch between the outputs of the main memory 42 and cache memory 44 at a speed which will not impede operation of the circuit. Typically, the output buffer associated with a ROM device is not fast enough for use in the present invention. The output buffers on the cache memory 44, however, typically has sufficient speed.

The operation of the circuit of FIG. 3 is best understood in connection with the diagram of FIG. 4 which illustrates a direct-mapped cache system. The cache memory 44 is logically divided into m blocks 45a. For purposes of illustration, it will be assumed that each block 45a comprises four 32-bit words. Each block in the cache memory 44 corresponds to a plurality of similarly configured blocks 45a in the main memory 42. Hence block 0 of cache memory 44 corresponds to blocks 0, m, 2m, 3m, and so one, of main memory 42. Block 1 of cache memory 44 corresponds to blocks 1, m+1, 2m+1, 3m+1, and so on, of main memory 42. Thus, if the information stored within block m+1 of main memory 42 is also stored within cache memory 44, the information in that block will be stored in block 1 of cache memory 44. Each set of m blocks 45a in the main memory 42 comprises a superblock 45b. The main memory comprises n superblocks 45b.

For illustration purposes, it is assumed that main memory 42 comprises a four megabyte memory (therefore storing one million 32-bit words). Cache memory 44 is a 128 kilobyte memory (therefore storing 32k words). Each logical block 45a is assumed to store four 32-bit words; therefore, cache memory 44 comprises 8k blocks 45a.

TABLE 1

| Address Bit Allocation | |
|---|---|
| Address | Bit |
| 0,1 | Byte within 32-bit word |
| 2,3 | Word Within 4 word cache block |
| 4–16 | Index (Block within cache) |
| 17–21 | Tag (Corresponding block in MM) |

Table 1 provides an address bit allocation for the embodiment described herein. Low-order bits 0, 1 define a byte within a 32-bit word. Because the primary function of this cache is storage of instructions which are predefined to be 32-bits in length and aligned on 4-byte boundaries, these bits are not used. Bits 2 and 3 of the address define a word within a four word cache block. Bits 4–16 define an Index defining a unique block within the cache memory. Bits 17–21 define a Tag corresponding to a superblock of main memory.

In operation, the circuit of FIG. 3 operates as follows. An address is received from the CPU 24 on address bus 32. The address on latched address bus 76 is latched into input circuitry 40. The address is then input to the address port of main memory 42 and cache memory 44 to access the data in the respective memories. For the cache memory 44, only the Index and Word bits (bits 2–16) are used. Simultaneously with accessing the main memory 42 and cache memory 44, the tag and valid word comparison circuitry 46 (described in greater detail in connection with FIG. 5) performs two functions. First, the tag and valid word comparison circuitry 46 determines whether the accessed block 45a of cache memory 44 was last updated with information from the superblock 45b indicated by the tag bits of the latched address. If so, the tag and valid word comparison circuitry 46 determines whether the data in the cache block at the address given by the word bits (bits 2–3) remains valid.

The tag and valid word comparison operations and the access to the cache memory are performed at a much higher rate than the access to the main memory 42 can be performed. Thus, if there is a cache "hit", the data may be output from the cache memory 44 by enabling buffer 50a or 50b as soon as the tag and valid word comparison is finished. Otherwise, if there is a cache miss, the control logic 52 delays until the main memory 42 is ready to output valid data, disables cache memory 44 output buffers, enables buffer 48 to output the data on the ID bus 74 and enables buffer 50a or 50b to output the data on the instruction bus 34 or data bus 36, respectively. The operation of cached ROM system 30 is described in greater detail in connection with FIG. 6.

Figure 5:
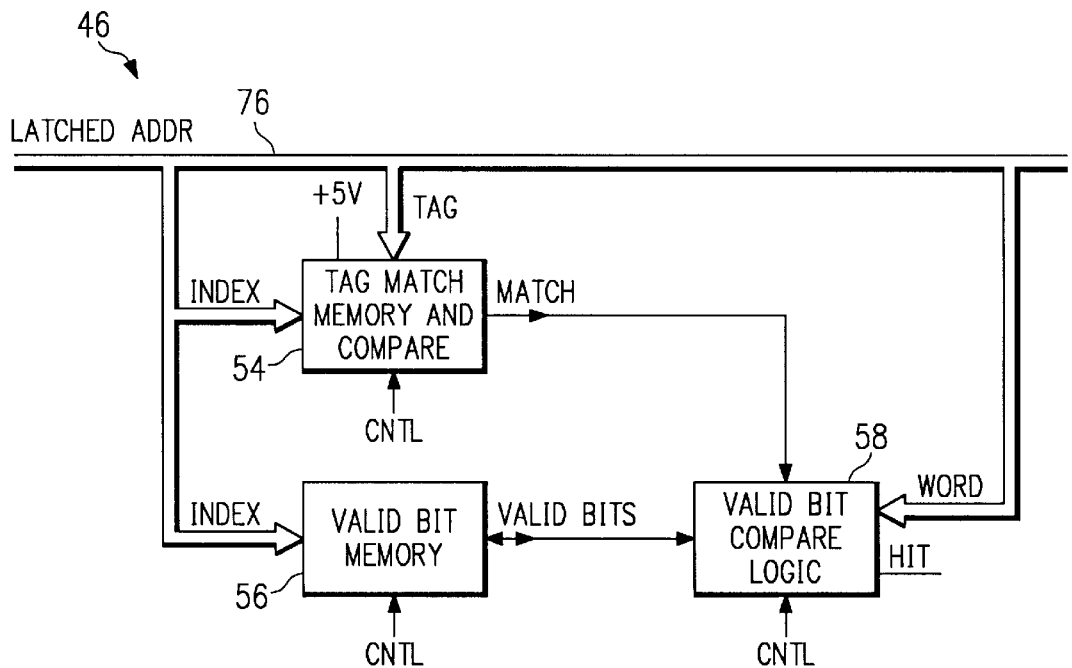
FIG. 5 illustrates a block diagram of the tag and valid bit memory subsystem.

FIG. 5 illustrates the tag and valid word comparison circuitry 46. The address bus 32 is coupled (via input circuitry 40) to tag match memory and compare circuitry 54, valid bit memory circuitry 56 and valid bit compare logic 58. Tag match memory and compare circuitry 54 outputs a match signal to valid bit compare logic 58. Valid bit information is transferred between valid bit memory 56 and valid bit compare logic 58. Control signals are output from the control logic 52 to the tag match memory and compare circuitry 54, valid bit memory circuitry 56 and valid bit compare logic 58.

The tag match memory and compare may be implemented by a L7C174 integrated circuit from Logic Devices, Inc. of Sunnyvale, Calif. The valid bit memory 56 may be implemented using a SRAM.

In operation, the tag match memory and compare circuitry 54 receives the Index bits from the latched address bus 76. The Index bits are used as an address to a location in the tag match memory which stores the tag corresponding to the superblock 45b which last wrote to each block 45a of cache memory 44. The tag bits from the latched address bus 76 are compared to the tag bits stored at the address in the tag match memory indicated by the Index bits. If the stored tag bits match the tag bits from the latched address bus 76, then there is a match. Otherwise, if the tag bits are different, then there is no match.

The valid bit memory 56 comprises a memory having a location for each block 45a in the cache. Each word in the valid bit memory 56 has one bit corresponding to each word in the block. Thus, for the illustrated embodiment, each word in valid bit memory 56 comprises four bits. The value of each bit indicates whether the corresponding word in the block is valid or invalid. Thus, if the data at location 0 of valid bit memory 56 was equal to "1101", it would indicate that the first, second and fourth words in block 0 of cache memory 44 were valid.

Valid bit compare logic 58 receives the Word address bits from latched address bus 76, the valid bits from valid bit memory 56 and the match signal from tag match memory and compare circuitry 54. If there is a match and if the valid bit corresponding to the word indicated by the word bits (bits 2–3) is valid, then there is a cache hit. Otherwise, the valid bit compare logic outputs a cache "miss".

The tag match memory and compare circuitry 54 includes a clear function which may be implemented by the control logic 52. The clear function is used upon startup to clear the tag match memory, since the cache will be empty. This creates a problem with the AMD 29000 CPU, since the CPU accesses memory location "0" upon start-up. The tag match memory and compare circuit 54 would thus register a match, since both the tag bits of the latched address and tag bits stored in the tag match memory will both be set to 0. In addition, the SRAM used for valid bit memory does not include a clear function and thus could erroneously indicate a word match. Therefore, a logical high is input to one of the I/O lines of the tag match memory and compare circuitry 54 in addition to the tag bits from the latched address bus 76. As a result, a cache miss will occur on start-up. Other operations of the tag match memory and compare circuitry 54 will not be affected by the logical high signal.

Figure 6:
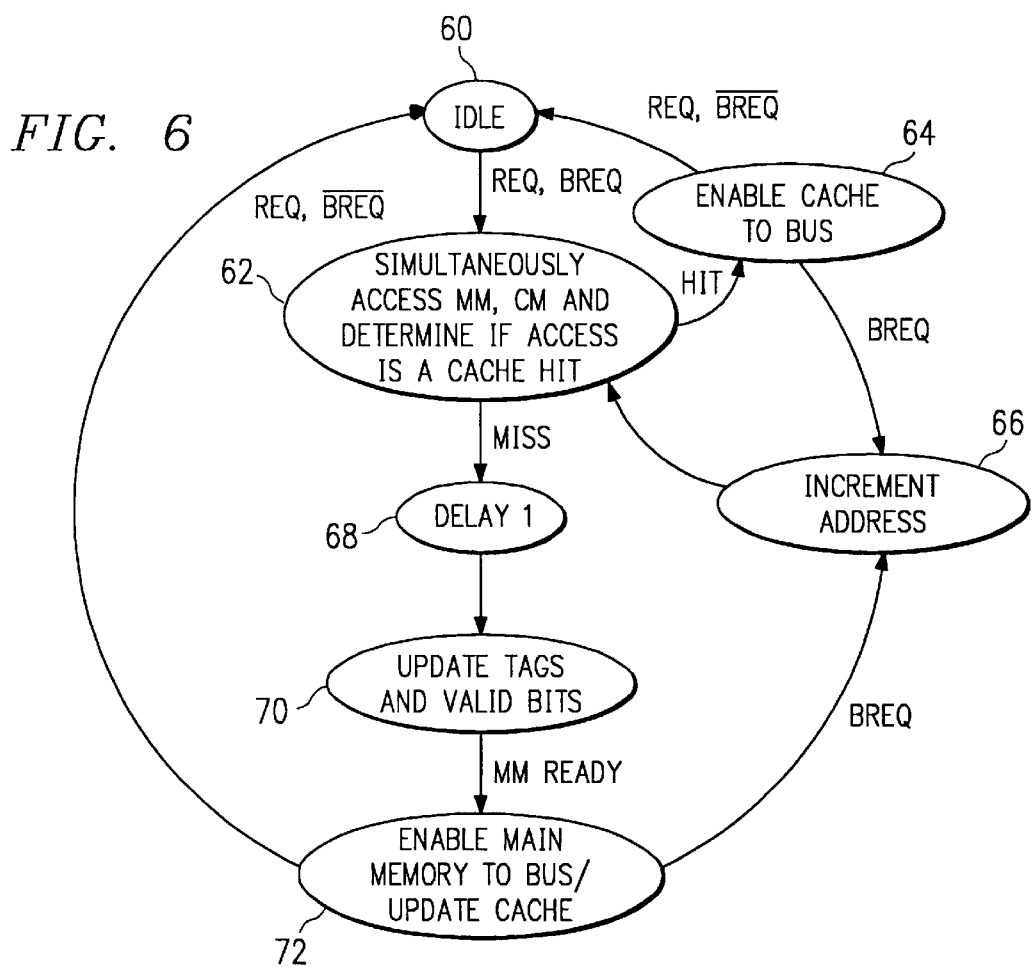
FIG. 6 illustrates a state diagram describing the operation of the present invention.

FIG. 6 illustrates a state diagram describing the operation of the circuit of FIG. 3 in greater detail. Initially, the cache memory system 30 is in an idle state 60. While in the idle state 60, the cache memory system 30 is waiting for a request from the CPU 24 for a memory access. The AMD 29000 CPU supports two types of memory requests. The first type of request, REQ, requests a memory access from a single address provided on the address bus 32. The second type of data request, BREQ, is a burst request wherein the processor supplies an initial address on the address bus 32 and while the BREQ request is enabled, the memory subsystem is required to supply sequential accesses to the memory without CPU intervention. This type of data request allows the CPU 24 to request a series of instructions and then use the address bus 32 for accessing data for the data bus 36 while instructions continue to be placed on the instruction bus 34. The reverse is also true if the CPU 24 were to request data from the instruction ROM while executing out of DRAM.

Upon receiving a REQ or BREQ signal from the CPU, the cached ROM system 30 switches to state 62 in which the main memory 42 and cache memory 44 are simultaneously accessed while the tag comparison and valid word comparison circuitry 46 determines whether the access is a cache hit. If there is a cache hit, the cached ROM system 30 switches to state 64 wherein the output of the cached memory is sent to the ID bus 74 and onto either the instruction bus 34 or the data bus 36 via buffers 50a or 50b, respectively. From state 34, the cached ROM system 30 returns to idle state 60 if the access request was an REQ. If the access request was a BREQ, then the address is incremented (by input circuitry 40) in state 66 and the memories 42 and 44 are simultaneously accessed along with determination of the tag comparison and valid word comparison in state 62. This cycle will continue until the BREQ signal is disabled or there is a cache miss.

If there is a cache miss, whether the access is an REQ or a BREQ, the cached ROM system 30 switches to state 68 for an initial delay because of the relative slowness of the main memory 42. From state 68, the cached ROM system 30 switches to state 70 where the tags and valid bits are updated in tag match memory 54 and valid bit memory 56. The tags and valid bits are updated on every cache miss, since the data to be received from the main memory 42 will be input into the cache memory 44. The valid bits are updated as follows: If there was a tag match, then the valid bit corresponding to the word retrieved from main memory is set to "1". If there was a tag miss, all valid bits corresponding to the block are set to "0" except for the valid bit corresponding to the retrieved word. If the main memory was a RAM, then the valid bits would need to be updated on writes to the main memory as well.

In the preferred embodiment, only the accessed word is updated in its respective block, rather than updating the entire block in anticipation that contiguous words will be fetched on the memory access cycle. This decision is based on the premise that the processor is just as likely to jump into the second half of the block as the first. Therefore, complete block fills will cause longer latencies on average than partial fills. This premise holds true whenever the cache implementation does not provide a bus between the main memory and the cache which is as wide as the block size (i.e., 4×32 bits). Since implementation of wide buses requires the use of large routing areas, as well as inherent noise problems caused by turning on multiple bus drivers, the preferred embodiment provides the width bus between the main memory 42 and cache memory 44 as between main memory 42 and the processor 24.

The delay in state 68 is designed such that after updating the tag and valid bit memories, the requested information will be valid at the outputs of the main memory 42. Hence, after update, the buffer 48 is enabled in state 72 to output the information to the ID bus 74 and on through buffer 50a or 50b to the instruction bus 34 or the data bus 36, respectively. The data on ID bus 74 is available to the cache memory 44 to store in the address given by the Index and word bits. After enabling the main memory to the bus, and updating the cache memory 44, the state switches to the increment address state 66 if the memory access was a BREQ or to state 60 if the memory access was a REQ, or if the BREQ is finished.

The present invention provides significant advantages over the prior art in speed. Because of the simultaneous access of the cache and main memories during determination of whether there is a cache hit, a significant speed increase is obtained.

Although the present invention and its advantages have been described in detail, it should be understood that various changes, substitutions and alterations can be made herein without departing from the spirit and scope of the invention as defined by the appended claims.

What is claimed is:

1. A method of accessing information in a processing system, comprising the steps of:
   receiving a main memory address indicative of desired information stored in a main memory;
   simultaneously retrieving information at said main memory address from said main memory until a cache hit signal is received and retrieving information at a cache memory address corresponding to said main memory address;
   determining whether the desired information is stored within the cache memory during said simultaneously retrieving step;
   if the desired information is in the cache memory,
   outputting the information accessed from said cache memory upon a determination that the information is within said cache memory;
   if the desired information is not in the cache memory, waiting for a period of time:
      after the waiting step, updating one of a tag memory and a valid data memory associated with the cache memory; and
      outputting the desired information accessed from said main memory, wherein the period of time is of such a length to guarantee that the desired information output from the main memory will be valid immediately after the updating step.

2. The method of claim 1 wherein said determining step comprises the steps:
   accessing a first tag from said tag memory responsive to a first predetermined portion of said main memory address; and
   comparing said first tag to a second tag comprising a second predetermined portion of said main memory address to determine whether said desired information is stored in the cache memory.

3. The method of claim 2 wherein said determining step further comprises accessing a valid data memory to determine whether the information stored in the cache memory at the cache memory address is valid.

4. The method of claim 3 wherein said step of updating said valid data memory comprises writing said second tag into said tag memory at an address based on said first predetermined portion of said address.

5. The method of claim 4 and further comprising writing the output of said main memory to said cache memory at an address specified by said first predetermined portion of said main memory address upon determination that the information is not within said cache memory.

6. The method of claim 2 and further comprising clearing the tag memory upon start up of the processing system.

7. The method of claim 6 and further comprising the step of setting at least one bit of said second tag to a predetermined value responsive to clearing the tag memory, such that said first and second tags are not equal during an initial access of said tag memory after clearing.

8. The method of claim 1 wherein said step of accessing information from said cache memory comprises the step of accessing information from said cache memory at an address specified by a predetermined portion of said main memory address.

9. A processing system comprising:
   a processor;
   a main memory coupled to said processor;
   a cache memory coupled to said processor and said main memory; and
   control circuitry, wherein said control circuitry is operable
      for simultaneously retrieving information from said main memory and said cache memory responsive to a memory request to a specified address by said processor;
      for determining whether information corresponding to the memory request is in said cache memory during retrieving information from of said main memory and said cache memory;
      for waiting for a period of time, then updating one of a tag memory and a valid data memory associated with the cache memory if the information is not in said cache memory wherein the period of time is of such a length to guarantee that the desired information output from the main memory will be valid immediately after the updating of one of the tag memory and the valid memory; and
      for terminating retrieving information from said main memory responsive to whether said memory request is in said cache memory.

10. The processing system of claim 9 wherein said control circuitry comprises:
    circuitry for accessing a first tag from said tag memory at a location corresponding to a first predetermined portion of said address; and
    circuitry for comparing said first tag to a second tag comprising a second predetermined portion of said address to determine whether information at the address in main memory is stored in the cache memory.

11. The processing system of claim 10 wherein said control circuitry further comprises:
    circuitry for accessing said valid data memory to determine whether information retrieved from the cache memory is valid.

12. The processing system of claim 10 wherein said circuitry for updating said valid data memory comprises circuitry for writing said second tag into said tag memory at a location corresponding to said first predetermined portion of said address.

13. The processing system of claim 10 wherein said control circuitry comprises circuitry for clearing the tag memory upon start up of the processing system.

14. The proessing system of claim 13 and further comprising the step of setting at least one bit of said second tag to a predetermined value responsive to clearing the tag memory, such that said first and second tags are not equal during an initial access of said tag memory after clearing.

15. The processing system of claim 9 wherein said control circuitry further comprises circuitry for writing an output from said main memory to said cache memory at a location corresponding to said first predetermined portion of said address upon determination that the information is not within said cache memory.

16. The processing system of claim 9 wherein said control circuitry comprises circuitry for retrieving information from said cache memory at a location corresponding to a predetermined portion of said address.

* * * * *

UNITED STATES PATENT AND TRADEMARK OFFICE
CERTIFICATE OF CORRECTION

PATENT NO. : 5,813,030
DATED : 09/22/98
INVENTOR(S) : Michael Eugene Tubbs

It is certified that error appears in the above-identified patent and that said Letters Patent is hereby corrected as shown below:

Col. 2, line 28, delete "using ache"; insert -- using the cache --.
Col. 3, line 62, delete "and so one"; insert -- and so on --.
Col. 7, line 28, delete "period of time:"; insert -- period of time; --.

Col. 8, line 21, delete "cache memory wherein"; insert -- cache memory, wherein --.

Col. 8, line 43, delete "system of claim 10"; insert -- system of claim 9 --.

Signed and Sealed this

Ninth Day of February, 1999

Attest:

Attesting Officer

*Acting Commissioner of Patents and Trademarks*